Aug. 7, 1951 J. W. CROWNOVER ET AL 2,563,773

AUDIO-FREQUENCY AMPLIFIER

Filed July 30, 1946 3 Sheets-Sheet 1

INVENTORS
J. W. CROWNOVER & H. W. KOREN
BY Pineles and Greene
ATTORNEYS

INVENTORS
J.W. CROWNOVER
& H.W. KOREN
BY Pinkham and Greene
ATTORNEYS

Aug. 7, 1951 J. W. CROWNOVER ET AL 2,563,773

AUDIO-FREQUENCY AMPLIFIER

Filed July 30, 1946 3 Sheets-Sheet 3

INVENTORS
J. W. CROWNOVER & H. W. KOREN
BY Pineles and Greene
ATTORNEYS

Patented Aug. 7, 1951

2,563,773

UNITED STATES PATENT OFFICE 2,563,773

AUDIO-FREQUENCY AMPLIFIER

Joseph W. Crownover, Hartsdale, and Heiman W. Koren, New York, N. Y., assignors to Sonotone Corporation, Elmsford, N. Y., a corporation of New York Application July 30, 1946, Serial No. 687,058

6 Claims. (Cl. 179—171)

This invention relates to audio-frequency amplifiers, and more particularly to the output stages of audio-frequency amplifiers of the type utilizing dry batteries or a similar energy source for supplying the operating energy.

There are many applications in which it is important to reduce to a minimum the average current drain of the D. C. source, such as a dry cell battery used for operating the amplifier. Among such applications are hearing aid amplifiers, adapted to be worn on the body of the user and midget-type radio broadcast receivers, which are either carried in the hand or worn on the body of the user.

In all such amplifier applications, the major part of the current drain is consumed in the output stage of the audio-frequency amplifier. In most cases, the output stage of such amplifier operates with a single midget-type output amplifier tube. Such output amplifier tube must be operated with a grid bias sufficiently negative to prevent the flow of grid current and yet not so negative as to cut off the space current through the tube at the negative peak of the signal current swing in the output circuit of the tube. Because of these requirements, the output tube of all prior audio amplifiers of this type had to be operated with an output tube bias halfway between cutoff and zero which subjected the D. C. source to a relatively large, steady current drain sufficient to provide for the maximum signal current swing in the output circuit. These requirements also imposed limitations on the character of the output amplifier tube suitable for use in such amplifier.

In accordance with the invention, the current drain from the D. C. source, such as a battery, used in such applications, is materially reduced by including in the output stage a special bias circuit connected between the control grid and the cathode of the output amplifier tube, the bias circuit including bias elements which impress upon the grid a quiescent negative bias voltage at which the space current through the output tube has a small desired quiescent value, the bias circuit also including a means operative to cause the bias voltage impressed upon its grid to become increasingly less negative as the input signal increases, so that the average space current increases when the signal input increases in order to provide sufficient space current at the maximum signal current swing.

By following the principles of the invention, audio output amplifiers may be designed with a materially smaller average current drain from the D. C. energy source. Furthermore, the output amplifier tube used in such amplifier may be chosen so as to operate with a larger output current swing than heretofore possible without increasing the average battery current drain beyond that heretofore required in such applications.

The foregoing and other objects of the invention will be best understood from the following description of exemplifications thereof, reference being had to the accompanying drawings, wherein—

Figure 1:
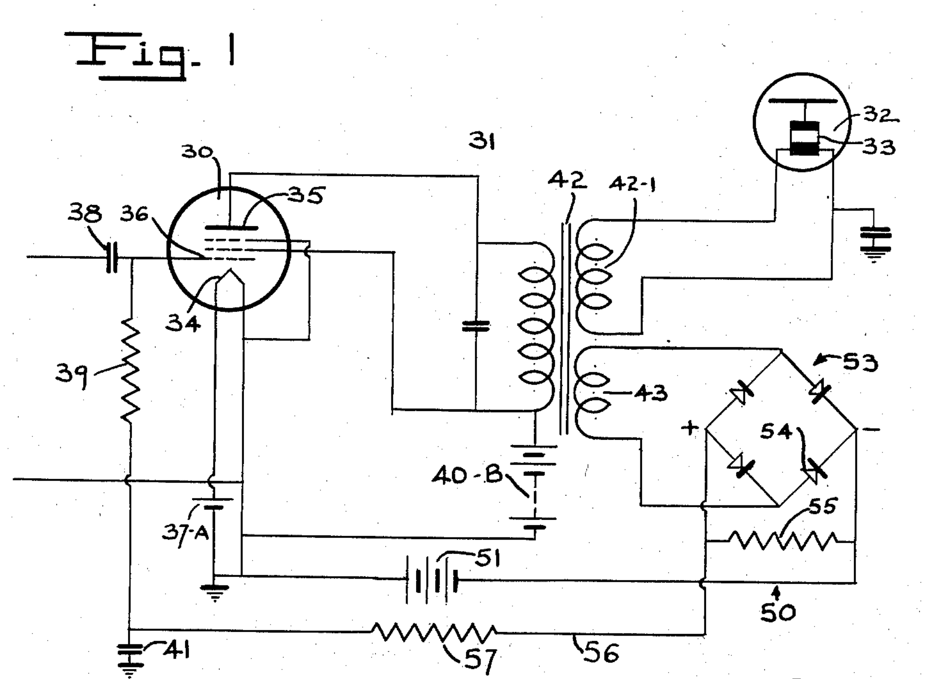
Fig. 1 shows diagrammatically one form of an audio amplifier stage exemplifying the invention.

In Fig. 1 is shown an audio-frequency amplifier stage including an output tube 30 which supplies the operating energy to an output device, indicated as a telephone receiver or loud speaker 32, having an output coil 33. The output amplifier tube 30 is shown in the form of a pentode having a cathode 34, an anode 35, a control grid 36, as well as the usual screen grid and suppressor grid. The cathode is shown supplied with a heating energy from a D. C. source, indicated in the form of a single dry cell 37—A. The input signal is impressed upon the control grid through an input circuit including a coupling condenser 38 and grid resistor 39 which is connected to ground through a blocking condenser 41. The output circuit includes the primary winding of power transformer 42 which is connected in series with a D. C. energy supply source, shown in the form of a dry cell B-battery 40—B, between the anode 35 and the cathode 34, a secondary winding 42—I of the transformer supplying the amplified signal current to the output or load device 32. The output circuit is also shown provided with a circuit connection for applying to the screen grid the proper positive potential, and a condenser connected and shunt to the primary of the transformer winding serves to limit its loading impedance, as seen from the output electrodes of tube 30.

Figure 3:
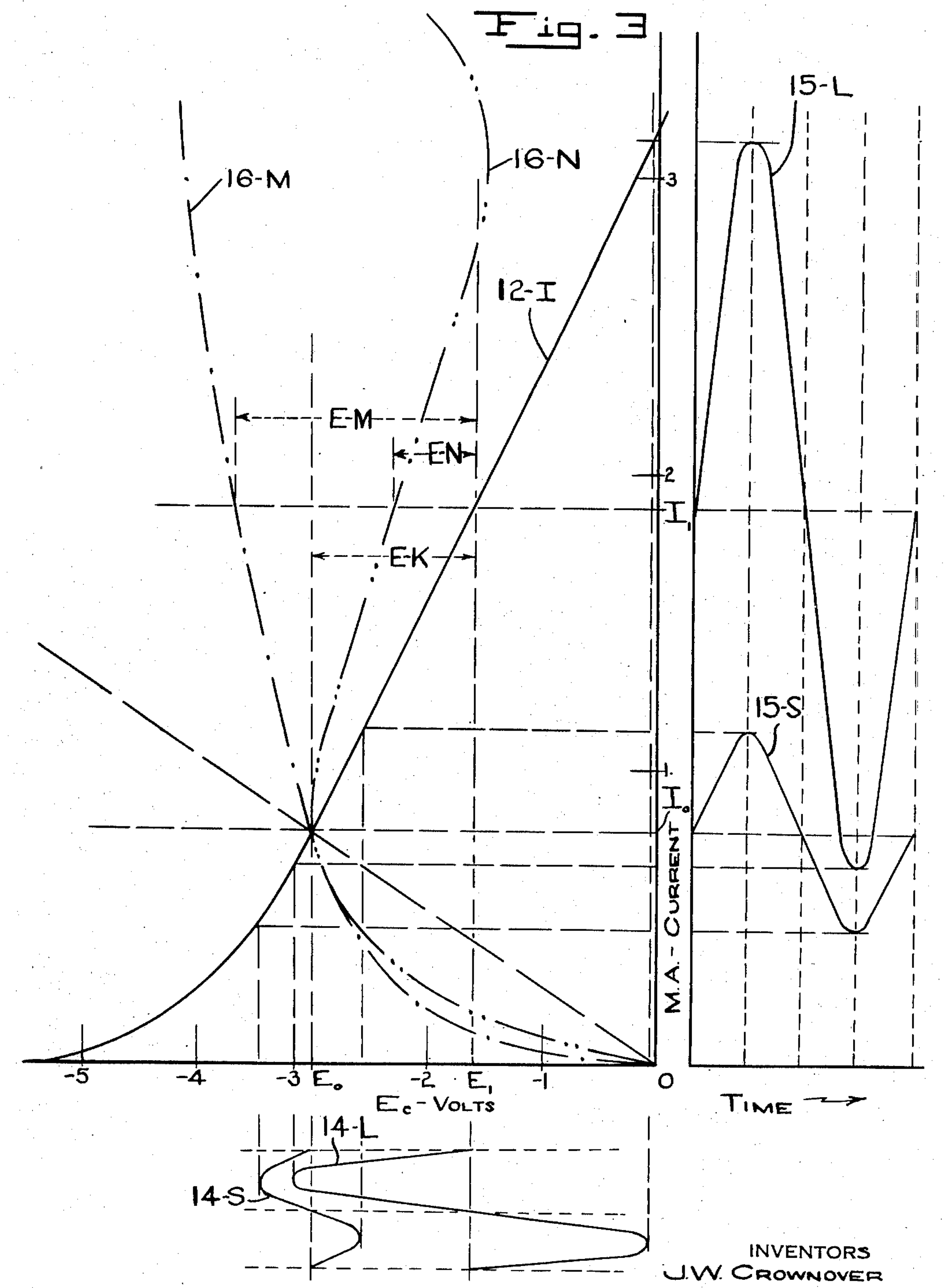
Fig. 3 shows curve diagrams explaining the operating features of amplifier arrangements of the invention.

In Fig. 3, the ordinates of curve 12—I represent the cathode or total space current of a typical output amplifier pentode tube as a function of the bias voltage applied to the control grid indicated along the abscissa axis. In the past, the output tube and the bias voltage applied to its control grid were so chosen that the average D. C. space or cathode current shall not be cut off for the maximum required swing of the signal current in the output circuit. To meet this requirement, an output tube having the characteristic shown in Fig. 3 was operated with a grid voltage such as indicated at E—1, at which the space current had a magnitude I—1, making it possible for the tube to deliver a maximum output current swing, indicated by the signal current wave 15—L, representing the desired largest signal current swing of the output stage.

Under such conditions, the output stage subjects the D. C. source at all times to a large average current drain I—1. Thus, in the prior art, conventional hearing-aid amplifiers using a standard sub-miniature pentode-type output tube operating with a B-battery of 45 volts, the average D. C. plate current drain was about 1½ milliamperes, thereby limiting the useful life of a typical B-battery to about 200 hours.

In accordance with the invention, the current drain of the output stage of such amplifier is materially reduced by combining the output stage with two bias elements connected in the bias circuit to the control grid, one of the bias elements being arranged to impress upon the grid a quiescent negative bias voltage at which the space current through the output tube has only a desired small quiescent value, the additional bias element being arranged to cause the bias voltage impressed upon the control grid to become increasingly less negative as the input signal increases, so that the average space current increases when the input signal increases, and vice versa.

In one form of an output circuit arrangement of the invention, one or several standard bias cells may be used as a bias element for impressing upon the control grid the desired quiescent negative bias voltage.

In another form of amplifier arrangement of the invention, the bias means for supplying the desired quiescent negative bias may be provided by non-linear resistance means of such characteristics and so connected in the bias circuit that the ratio of the voltage drop across it over the current passing therethrough becomes smaller with increasing current.

The other biasing element, which operates to cause the bias voltage impressed upon the grid to become increasingly less negative as the input signal increases, may be formed of an element coupled to the output circuit so as to develop a bias voltage varying in accordance with the variations of the magnitude of the signal current. Rectifier means may be included in the circuit of the additional bias means so as to rectify a small portion of the output power amplified thereto, and the biasing circuit may be provided with filter means for averaging the D. C. voltage components developed therein and for supressing A. C. components.

Fig. 1 shows one form of an amplifier arrangement of the invention. A biasing element 51, shown formed of a battery, and an additional biasing element, generally designated 53, are connected in the circuit between the cathode 34 and the anode 35, the circuit connection to the anode being provided by an additional secondary transformer winding 43 through which the biasing circuit is coupled to the output circuit leading from the anode 35. The additional biasing element is shown formed by a conventional rectifying bridge with four rectifier elements 54 so as to develop across their resistance, indicated by the resistor element 55, a rectified voltage component proportional to the signal current in the output circuit. The rectifier resistance 55 is connected with the biasing element 51 of the biasing circuit in such manner that the rectified voltage appearing across resistance 55 acts in series with the biasing voltage of the element 51 so as to render the bias voltage applied to the control grid 36 increasingly less negative as the signal current increases.

In order to average the D. C. voltage component and suppress the A. C. voltage component developed across the rectifier resistance 55, the biasing circuit portion of lead 56 has connected therein an additional filter resistance 57, cooperating with the grid circuit blocking condenser 41 as a filter circuit providing the desired filter action.

The circuit elements, including the transformer windings 43 and the rectifier bridge 53, are so designed that the rectified voltage developed across the resistance 55 acts in a direction opposite to the bias voltage impressed on the control grid through the resistive element 39 to produce the operating conditions described in connection with Fig. 3.

Fig. 3 shows the mode of operation of the amplifier arrangement of Fig. 1. In Fig. 3 the grid voltage $E_0$ represents the negative or quiescent bias voltage applied to the control grid 36 when the input signal voltage impressed thereon is zero or of negligible magnitude. Thus, a small input signal voltage—indicated by the voltage wave 14—S along the time axis formed by an ordinate extending at the quiescent voltage $E_0$—will produce in the output circuit a relatively small signal current wave 15—S, assuring that the output circuit draws from the B-battery 40—B only a relatively small average space current $I_0$ substantially equal to the quiescent space current. However, when a larger input signal voltage 14—L is applied to the control grid 36, the signal current flowing in the output circuit will impress through the additional biasing circuit elements 53 an additional opposite biasing voltage E—K, thereby reducing the effective negative bias voltage applied to the control grid 36 of the output tube 30 to $E_1$ at which the output circuit will deliver the large signal current wave 15—L, in which condition the average cathode or space current has the required large value $I_1$.

Figure 2:
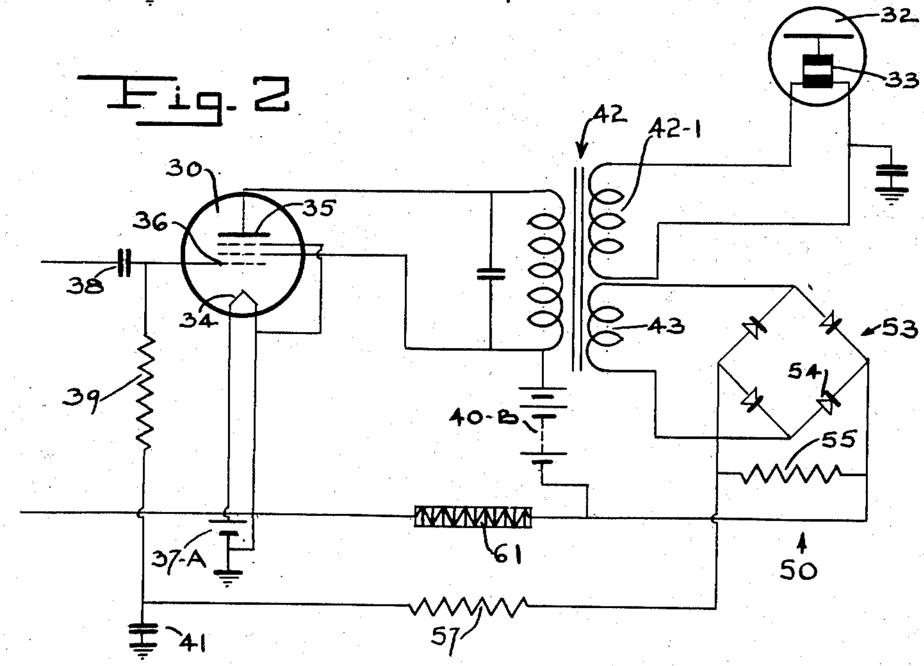
Fig. 2 shows diagrammatically another form of audio amplifier stage exemplifying the invention.

In Fig. 2 is shown another amplifier circuit arrangement of the invention. It has an output amplifier stage including an output tube 30, and input and output circuit elements generally similar to those of Fig. 1. A biasing circuit, generally designated 50, interconnected through the secondary transformer winding 43 between the anode and cathode of tube 30, includes a non-linear resistance element 61 connected between the negative terminal of the B-battery 40—B and the cathode 34, the biasing circuit being completed by the rectifier bridge 53 with its resistance 55 and the filter including resistance 57.

The non-linear resistor element 61 of the biasing circuit may be formed either by rectifier elements such as copper-oxide, or selenium rectifier elements of the instrument type, or by non-linear resistances such as a Tyrite element, the general class of such non-linear resistors being also known as varistors.

The curve diagram of Fig. 3 illustrates the operating conditions of an amplifier arrangement of the type shown in Fig. 2, where the non-linear resistor 61 is formed by a rectifier element such as a copper-oxide rectifier. In Fig. 3, the curve 16—M represents the voltage current characteristic of a copper-oxide non-linear resistor element 61, the increase in the current indicated by the ordinates causing the voltage drop to increase from zero toward the left along the abscissa axis. The parameters of the biasing circuit, including the secondary transformer winding 43 and the rectifier bridge 53, are so chosen and designed in relation to the operating characteristics of the non-linear resistor element 61 that when a zero input signal is applied to the control grid 36, the voltage developed across the varistor 61 applies to the control grid 36 a biasing voltage $E_0$ at which the average cathode or space current of the tube has the desired relatively small value $I_0$; and that when a maximum signal input voltage, indicated by the wave 14—L, is applied to the control grid, the large signal current flowing in the output circuit will cause the rectifier bridge 53 to develop in the biasing circuit an opposing series voltage E—M, which decreases the bias voltage applied to the control grid 36 by the varistor 61 to an effective value E—1, at which the output tube operates with a maximum desired current swing 15—L at which the average space current has the required large value $I_1$.

In Fig. 3, curve 16—N indicates, in a manner analogous to curve 16—M, the current voltage characteristics of a varistor element 61 formed of a thermistor. With such biasing arrangement, the several parameters of the circuits are so designed that in the absence of an input voltage, the thermistor element 61 will apply to the control grid 36 a bias voltage $E_0$ at which the quiescent space current has the small value $I_0$; and that an increase of the input signal, accompanied by a corresponding increase in the space current, causes the additional bias means 53 to impress on the biasing circuit an opposing bias voltage E—N which reduces the effective bias applied to the control grid 36 to the value $E_1$, at which the tube 30 will deliver the large signal current wave 15—L at which the average space current has the required larger value $I_1$.

Figure 4:
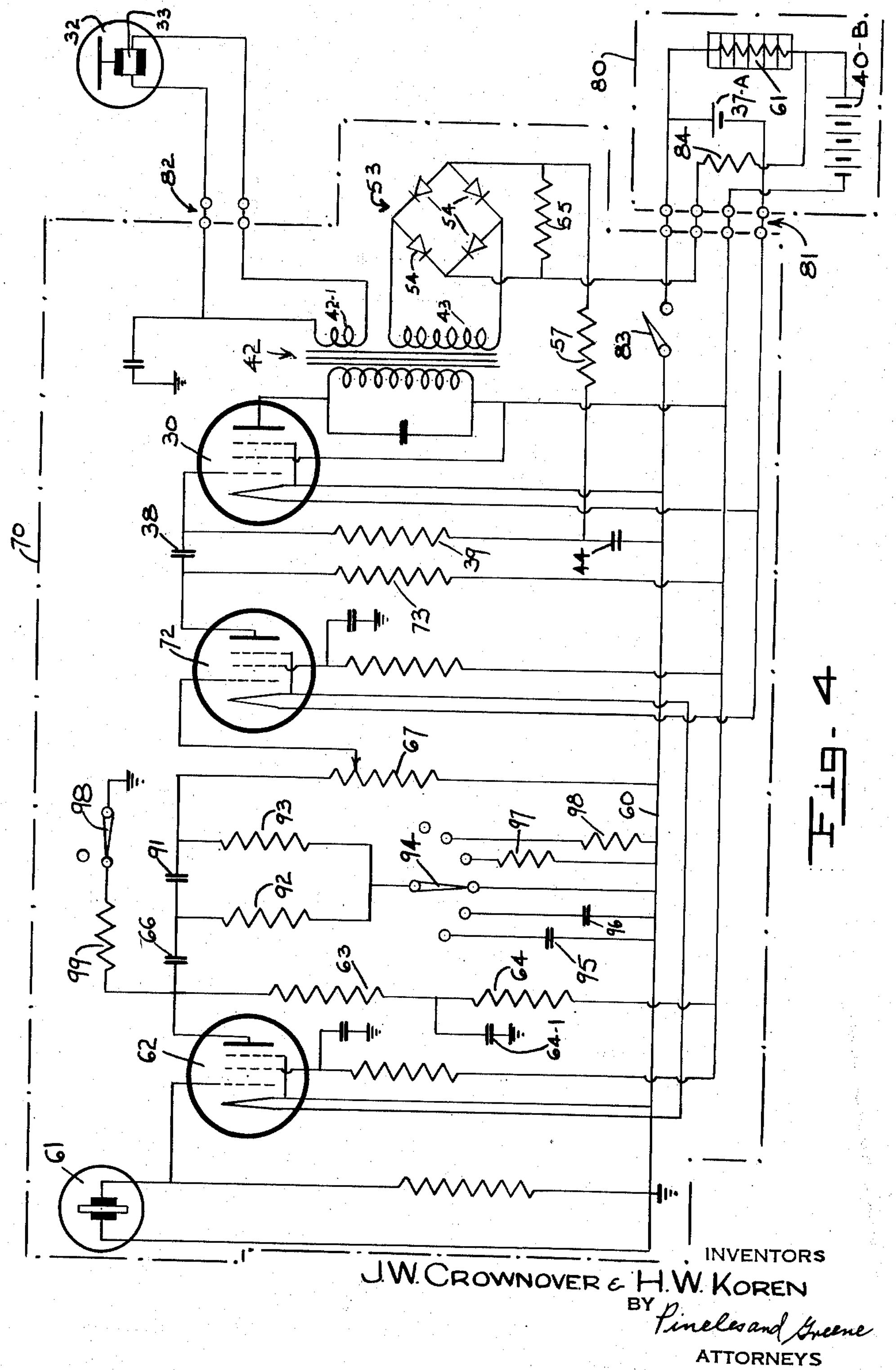
Fig. 4 is a circuit diagram of a hearing aid exemplifying one form of a practical application of the invention.

In Fig. 4 is shown diagrammatically one practical form of an electronic amplifier hearing aid embodying an output amplifier stage based on the principles of the invention. It has a high impedance microphone 61, the output of which is impressed on the first high-gain amplifier stage including an amplifier tube 62, shown as a pentode. The pentode 62 impresses the amplified microphone input on an output circuit including a load resistor 63 and a coupling resistor 64 which is shunted by the by pass condenser 64—1. The amplified output voltage developed by the first-gain stage across the load resistor 63 is impressed through a circuit including a coupling condenser 66 and a variable potentiometer-type resistance 67 which serves as the volume control. A component of the voltage impressed on the potentiometer resistance 67 is impressed through a tap thereof on the input side of a second amplifier gain stage including an amplifier tube 72 shown in the form of a pentode. The tube 72 of the second amplifier gain stage impresses its output on a load or coupling resistance 73, and the voltage developed across it is impressed through the coupling condenser 38 on the input or control grid of the power of the amplifier tube 30, which forms part of the output amplifier stage of the type described above in connection with Fig. 2.

As shown in Fig. 4, all the elements of the amplifier unit, except for the elements of the battery assembly, may be housed in a small, flat, compact casing indicated by the dash-dot line 70, the hearing aid being connected to the battery assembly, indicated by the dash-dot line 80, through a flexible cord or plug indicated at 81. In a similar manner, the flexible cord extending from the receiver 33 is connected to the operating circuit elements of the amplifier unit through detachable plug connector elements indicated at 82. It will be noted that the battery assembly 80 has mounted therein the B-battery 40—B as well as the A-battery 37—A. A manually operable switch 83 forming part of the amplifier unit 70, serves to complete the energizing circuit from the A-battery 37—A to the cathodes of the amplifier tubes whenever the hearing aid is to be rendered operative.

Most hard of hearing or deafened persons are very sensitive and seek to conceal their hearing impairment. Accordingly, a practical hearing aid must be light, small and compact so that it may be worn comfortably and inconspicuously on the body of the user. Accordingly every precaution must be taken to assure that the user of the hearing aid is protected against injuries, such as caused by contact of a part of his body with a circuit element of the amplifier hearing aid through which the relatively high voltage terminal of the B battery or energy source is supplied to the tube elements of the amplifier.

In the form of hearing aid shown in Fig. 1, this is accomplishd by placing in the battery unit 80 resistive amplifier circuit elements in such manner as to assure that when a circuit element of the hearing aid amplifier makes contact with the body portion of the user, the current flowing through the body will limit it to a value at which no harm or damage can be done to the user.

As indicated in Fig. 4, the high voltage terminal of the B battery 40—B has connected in series therewith the bias circuit element 61 housed in the battery unit 80 so as to limit the current that could be supplied by the high voltage terminal of the B battery to the circuit elements of the amplifier connected thereto. Furthermore, an additional resistor element 84 placed in the battery unit 80 and connected in series between the high voltage positive terminal of the B battery 40 and the other elements of the amplifier energized thereby serve the same purpose in preventing a dangerous flow of current from the B battery 40—B to any part of the body coming in contact with a live circuit element of the amplifier hearing aid.

The other elements of the output amplifier stage associated with tube 30 of Fig. 4 are identical with those described above in connection with Fig. 2 and require no further explanation.

The amplifier hearing aid of Fig. 4 is also shown provided with a special tone control circuit interconnected with the circuit through which the first high gain tube 62 is coupled to the input side of the second high gain tube 72. In the form shown, the tone control circuit comprises a T-type network comprising a series resistor element 91 shown connected between the coupling condenser 66 and the volume control potentiometer 67, two shunt resistors 92, 93 being connected in front and back of the condenser 91 in series with a switch 94 through which the shunt circuit may be connected either directly to the cathode lead 60 of the amplifier or selectively through either one of the two condensers 95, 96 or through either one of the two resistors 97, 98. In addition, there is also provided a selective control circuit including a resistance 99 and a switch 98 connected between the high voltage terminal of the load resistance 63 of the high gain amplifier stage and the ground for controlling the low frequency response characteristics of the amplifier without producing any substantial change in the response of the amplifier circuit for the higher frequencies which are required for assuring intelligibility.

In order to enable ready practice of the invention and without in any way limiting its scope, there are given below design data which were found satisfactory in one practical form of hearing aid shown in Fig. 4.

The microphone 61 was a Rochelle salt crystal microphone and the input resistor through which it is coupled to the control grid of tube 62 was 5 megohms.

*Resistances*

| | | |
|---|---|---|
| 63 | megohms | 1.5 |
| 64 | do | .5 |
| 67 | do | 5 |
| 73 | do | 1.5 |
| 39 | do | 5 |
| Of copper-oxide rectifier bridge 53 | megohm | 1 |
| 57 | do | 1 |
| 84 | ohms | 1000 |
| 92, 93 | megohms, each | .56 |
| 97 | do | .22 |
| 98 | do | .56 |

*Condensers*

| | | |
|---|---|---|
| 66 | microfarad | .0005 |
| 91 | do | .00005 |
| 95 | do | .0001 |
| 96 | do | .0005 |
| 38 | do | .0005 |
| 44 | do | .03 |

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

We claim:

1. In an amplifier circuit of a device, such as a hearing aid, which is energized from a direct current B-source, such as a battery, and which comprises an output amplifier stage including a power amplifier tube having an anode, a cathode and a control grid and an associated output circuit including a load connected between said anode and said cathode for supplying to the load a signal current varying substantially in accordance with the signal input voltage impressed on said grid, the combination comprising a bias circuit connected between said grid and said cathode for suppressing a bias voltage on said grid; said bias circuit including non-linear resistance elements serially connected in said output circuit between said cathode and said B-source and having a circuit connection to said grid for developing and impressing on said grid a negative quiescent bias voltage large enough to maintain said space current at a relatively low quiescent value when the input voltage is low; said bias circuit also comprising an additional bias circuit portion connected between said non-linear resistance elements and said grid and also connected to said output circuit for developing and impressing on said grid an additional bias voltage responsive in a predetermined manner to variations of the signal current and thereby causing said grid to become increasingly less negative as the input voltage increases so that the average space current increases substantially above said quiescent value only when the input voltage increases.

2. In an amplifier circuit as claimed in claim 1, said additional bias circuit portion including rectifier means for developing said additional bias voltage.

3. In an amplifier circuit as claimed in claim 1, said output circuit including a transformer, said additional bias circuit being connected to said output circuit through said transformer for developing said additional bias voltage.

4. In an amplifier circuit as claimed in claim 1, said output circuit including a transformer connecting said load to said anode, said additional bias circuit portion including rectifier means connected through said transformer to the output circuit for developing said additional bias voltage.

5. In an amplifier circuit as claimed in claim 1, said output circuit including a transformer having primary windings connected between said anode and said cathode and secondary windings at least some of which are connected to said load, said additional bias circuit being connected to said output circuit through at least some of said secondary windings for developing said additional bias voltage.

6. In an amplifier circuit as claimed in claim 1, said output circuit including a transformer having primary windings connected between said anode and said cathode and secondary windings at least some of which are connected to said load, said additional bias circuit including rectifier means connected to said output circuit through at least some of said secondary windings for developing said additional bias voltage.

JOSEPH W. CROWNOVER.
HEIMAN W. KOREN.

REFERENCES CITED

The following references are of record in the file of this patent:

UNITED STATES PATENTS

| Number | Name | Date |
|---|---|---|
| 2,083,626 | Wirix | June 15, 1937 |
| 2,096,625 | Brown | Oct. 19, 1937 |
| 2,103,490 | Peterson | Dec. 28, 1937 |
| 2,120,995 | Van de Reit | June 21, 1938 |
| 2,182,329 | Wheeler | Dec. 5, 1939 |
| 2,369,030 | Edwards | Feb. 6, 1949 |
| 2,468,082 | Chatterjea | Apr. 26, 1949 |